(No Model.)
M. BURTON & L. G. BEERS.
ANIMAL TRAP.
No. 530,158. Patented Dec. 4, 1894.
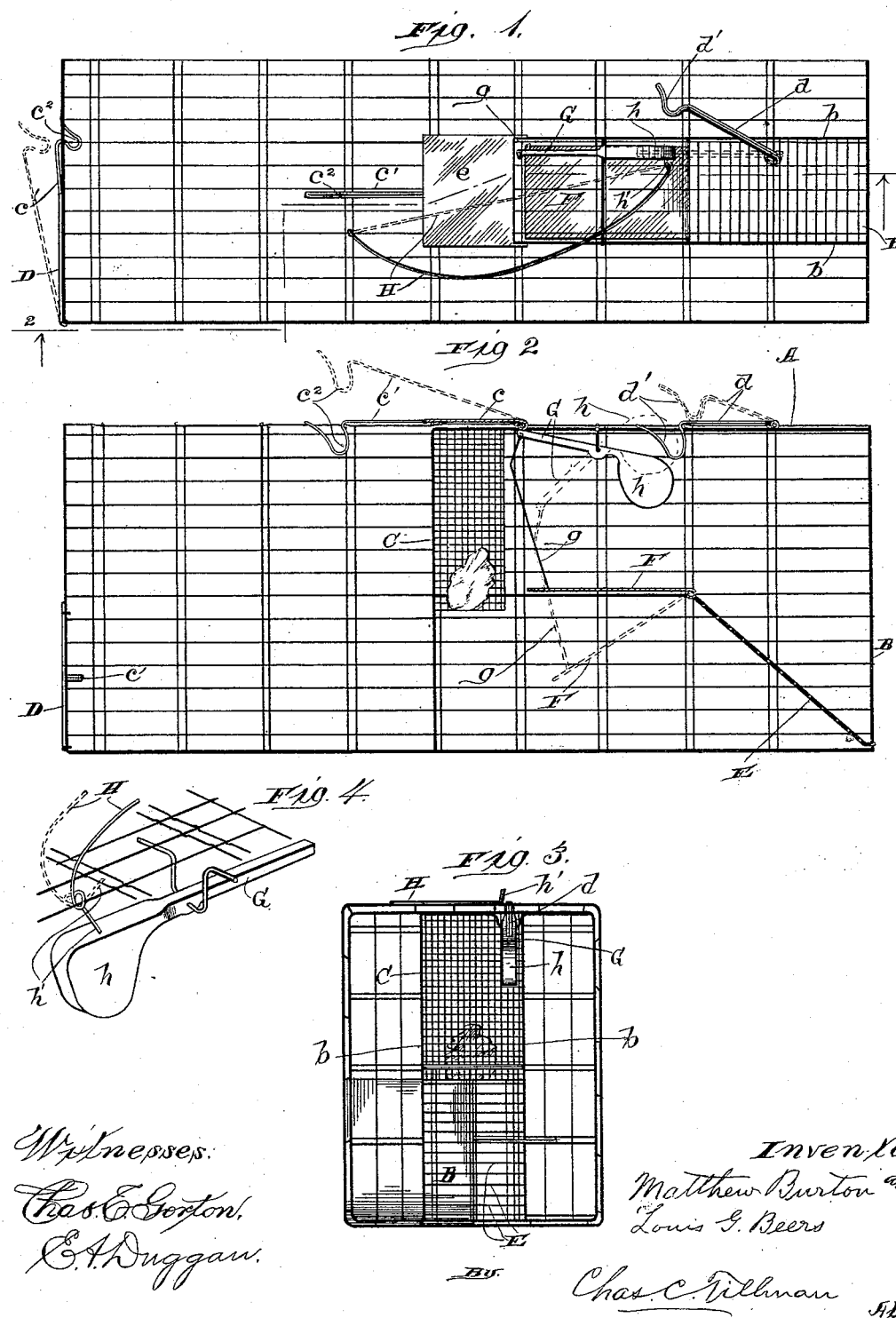
Witnesses:
Chas. E. Gorton.
E. A. Duggan.
Inventors
Matthew Burton and
Louis G. Beers
By Chas. C. Tillman
Attys.

UNITED STATES PATENT OFFICE.

MATTHEW BURTON AND LOUIS G. BEERS, OF CHICAGO, ILLINOIS.

ANIMAL-TRAP.

SPECIFICATION forming part of Letters Patent No. 530,158, dated December 4, 1894.

Application filed March 20, 1894. Serial No. 504,385. (No model.)

*To all whom it may concern:*

Be it known that we, MATTHEW BURTON and LOUIS G. BEERS, citizens of the United States, and residents of Chicago, in the county of Cook and State of Illinois, have invented certain new and useful Improvements in Animal-Traps, of which the following is a specification.

This invention relates to improvements in animal-traps, and consists in certain peculiarities of the construction, novel arrangement, and operation of the various parts thereof, as will be hereinafter more fully set forth and specifically claimed.

The objects of our invention are, first, to afford an animal-trap, which shall be simple and inexpensive in construction, effective in operation, yet strong and durable; second, such a trap, which by reason of the peculiar arrangement of its different parts shall be more compact in size, and will require a smaller quantity of material, thus rendering it cheaper to manufacture and less expensive in shipping; and third, a trap, which may be baited without the necessity of placing the hand within the interior of the cage, and when being carried with captured animals therein, will be automatically locked, so as to prevent their accidental escape.

In order to enable others skilled in the art to which our invention pertains to make and use the same, we will now proceed to describe it, referring to the accompanying drawings, in which—

Figure 1, is a plan view of our trap, as it appears when ready for use. Fig. 2, is a longitudinal sectional view thereof, taken on line 2, 2, of Fig. 1. Fig. 3, is an end view, and Fig. 4, is a perspective view in detail of a portion of the cage, the carrying handle and the operating-lever, showing the manner of locking the same, when the trap is being moved.

Similar letters refer to like parts throughout the different views of the drawings.

A, represents a cage made of any suitable size, form, and material, but preferably of wire-work formed into rectangular shape. In one end of this cage is provided an opening or passage-way B, which may extend from the top to the bottom of the cage, as is clearly shown in Fig. 2, and is provided with walls $b$, of wire-work or other suitable material, which walls extend parallel with one another toward the central portion of the cage, about the end of which is placed a food-receptacle C, having an exterior opening preferably in the top of the cage, which is closed by a hinged door $c$, which door is provided with a catch or fastening $c'$, having a downward bend or hook $c^2$, to engage the meshes of the wire-cage. This form of the hook or catch is preferred for the reason that in packing the traps they will not protrude, so as to interfere or become entangled with the wire-work or other traps placed on them. We also use on the door D, which closes the exit-opening, in the opposite end of the cage from the entrance, a similar catch $c'$, which by reason of the aforesaid form, possesses the same merit.

The lower portion of the opening or entrance B, of the cage, is provided with a flooring E, which inclines from the lower part of the cage upwardly, as shown in Fig. 2, to a proper point, at the upper part of which is pivotally secured a trap-door or platform F, which extends from the top of the flooring E, to near the food-receptacle C, and lies normally in a horizontal position.

Above the platform or trap-door F, is fulcrumed a lever G, to the inner end of which is secured a rod $g$, or other suitable connection, which unites the said lever and platform or trap-door. The free end of the lever G, is weighted or formed with an enlargement $h$, to counterbalance the weight of the trap-door, so as to hold it in its normal position.

As shown in Figs. 1, 3, and 4, of the drawings, the upper portion of the cage, is provided with a handle or hand-piece H, which is preferably formed of wire, having bearings near each of its ends to engage the wire-work of the cage, and at one of its ends a projection $h'$, bent at substantially a right angle to the hand-piece, so that when the same is in a raised position, the said projection will rest on the top of the free end or portion of the lever G, and will thus hold it in a locked position, yet when the handle is lowered, the said projection will be removed from the said lever, and will allow of the free movement thereof. This projection of the hand-piece may be so formed, as to engage the lower portion of the lever, when it, the handle, is raised, and thus secure the lever in a fixed position, when the cage is being moved or carried.

From the foregoing it will be understood that by placing the weighted lever above the platform or trap-door, we are enabled to considerably shorten the length of the cage, thereby effecting a saving in the quantity of material required, and also obtaining a more compact trap, which is an item of considerable importance. Another advantage in so placing the lever, is, that its movement will not be so readily detected by the animal.

Instead of using the hand-piece H, to secure the lever, in a fixed position, we may use a catch $d$, which is loosely secured to the wirework at one end, and has formed on its other end a hook $d'$, similar to the hooks on the catches $c'$, and is for a like purpose.

Having thus fully described our invention, what we claim as new, and desire to secure by Letters Patent, is—

1. An animal-trap consisting of a cage having an opening therein for the ingress of the animal, a trap-platform pivotally secured at said opening, a weighted lever fulcrumed above the platform and connected therewith and adapted to normally close the opening with the door, and a hand-piece or handle secured at the upper portion of the cage and adapted to engage said lever and hold it in a fixed position when the handle is raised, substantially as described.

2. The combination in an animal-trap of a cage having an opening therein for the ingress of the animal, with a trap-platform pivotally secured at said opening a weighted lever fulcrumed above the platform and connected therewith, and adapted to normally close the opening with the door, a hand-piece or handle secured at the upper part of the cage and adapted to engage said lever and hold it in a fixed position, when the handle is raised, and a food-receptacle having an exterior opening, substantially as described.

3. The combination of the cage A, having the passage-way or opening B, for the ingress of the animal, the platform F, pivoted in said opening, the lever G, fulcrumed above said platform and connected thereto, the handle H, secured to the upper part of the casing, and having the projection $h'$, to engage said lever, the food-receptacle C, located near the end of the platform F, and having an exterior opening, and the door $c$, provided with the catch $c'$, and hook $c^2$, and the door D, at the opening for the egress of the animal, all constructed, arranged and operating, substantially as and for the purpose set forth.

MATTHEW BURTON.
LOUIS G. BEERS.

Witnesses:
CHAS. C. TILLMAN,
E. A. DUGGAN.